(12) United States Patent
Jang

(10) Patent No.: US 6,748,702 B2
(45) Date of Patent: Jun. 15, 2004

(54) OUTSIDE WEATHER STRIP OF A VEHICLE

(75) Inventor: Gi-Soo Jang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/329,136

(22) Filed: Dec. 23, 2002

(65) Prior Publication Data

US 2003/0228440 A1 Dec. 11, 2003

(30) Foreign Application Priority Data

Jun. 11, 2002 (KR) ......................... 2002-32535

(51) Int. Cl.$^7$ ................................ B32B 3/10
(52) U.S. Cl. .................. 49/475.1; 428/99; 428/131
(58) Field of Search .................. 428/98, 99, 31, 428/131; 49/475.1

(56) References Cited

U.S. PATENT DOCUMENTS

| | | | |
|---|---|---|---|
| 3,830,018 A | 8/1974 | Arai et al. | |
| 4,015,760 A | * 4/1977 | Bott | ............ 49/475.1 |
| 4,284,304 A | 8/1981 | Nakamura | |
| 4,322,105 A | 3/1982 | Onda | |
| 4,378,130 A | 3/1983 | Shimizu | |
| 4,756,944 A | 7/1988 | Kisanuki | |
| 4,769,950 A | 9/1988 | Ogawa et al. | |
| 4,843,759 A | 7/1989 | Kisanuki et al. | |
| 5,052,743 A | 10/1991 | Inada et al. | |
| 5,054,240 A | * 10/1991 | Nakahara et al. | .......... 49/475.1 |
| 5,163,248 A | 11/1992 | Bielis et al. | |
| 5,233,758 A | 8/1993 | Bielis et al. | |
| 5,356,194 A | 10/1994 | Takeuchi | |
| 5,367,830 A | 11/1994 | Omura et al. | |
| 5,369,914 A | 12/1994 | Takeuchi | |
| 5,404,677 A | 4/1995 | Umeda | |
| 5,527,583 A | 6/1996 | Nozaki et al. | |
| 5,636,895 A | 6/1997 | Ito et al. | |
| 5,711,907 A | 1/1998 | Nozaki et al. | |
| 6,250,018 B1 | 6/2001 | Kawai et al. | |

* cited by examiner

*Primary Examiner*—Alexander S. Thomas
(74) *Attorney, Agent, or Firm*—Morgan Lewis & Bockius LLP

(57) ABSTRACT

An outside weather strip of a vehicle is disclosed. There is provided a movable end piece that can be adjusted in the lengthwise direction of the weather strip in relation to the end of the outside weather strip by manipulating the guide bolt. Accordingly, the gaps that are generally formed between the movable end piece and the door outer panel can be completely eliminated, thereby preventing noise, and maintaining its aesthetic feature.

7 Claims, 4 Drawing Sheets

OUTSIDE WEATHER STRIP OF A VEHICLE

FIELD OF THE INVENTION

The present invention relates to a weather strip for a vehicle window, and more particularly, to an outside weather strip which prevents gap formation.

BACKGROUND OF THE INVENTION

In general, the front doors and the rear doors of a car are provided with a movable window glass that ascends and descends along the door outer panel. A seal is formed by an outside weather strip, which is installed on the door outer panel. Typically, an end piece is installed at the end of the outside weather strip in such a manner that the end piece facially contacts a bent portion of the door outer panel, thereby forming the seal.

However, the conventional end piece is integrally injection-molded together with the outside weather strip, but cannot be precisely installed. This permits the formation of a gap between the end piece and door outer panel and thus the generation of noise caused by blowing wind.

SUMMARY OF THE INVENTION

Embodiments of the present invention provide an outside weather strip for a vehicle that prevents formation of a gap between the door outer panel and end piece coupled to the outside weather strip. In accordance with a preferred embodiment of the present invention, an outside weather strip comprises a movable end piece slidably fitted to an end of the outside weather strip in its lengthwise direction and a sliding means for connecting the movable end piece to the outside weather strip and for adjusting or fixing the sliding motions of the movable end piece relative to the outside weather strip.

In a further preferred embodiment, a weather strip body piece has a threaded connector formed on an end. A moveable end piece is slideably fit on the end of the body piece. The moveable end piece has an extending portion with a hole therethrough. A bolt passes through the hole and is received in the threaded connector to adjustably secure the moveable end piece to the weather strip. Preferably, the extending portion has guide plates extending therefrom towards the threaded connector. The guide plates are configured to guide the moveable end piece into alignment with the body piece. The bolt preferably includes a threaded portion and a head with the threaded portion spaced from the head a sufficient distance to permit free rotation in the hole in the movable end piece.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE PREFERRED EMBODIMENT

Figure 1:
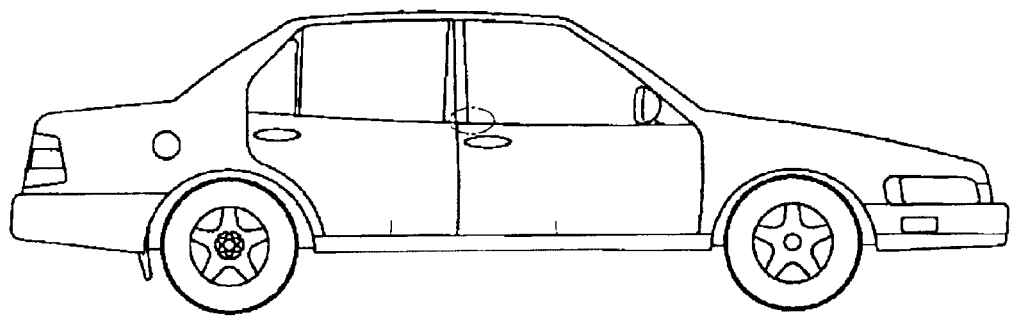
FIG. 1 is a side view of a vehicle.
Figure 2:
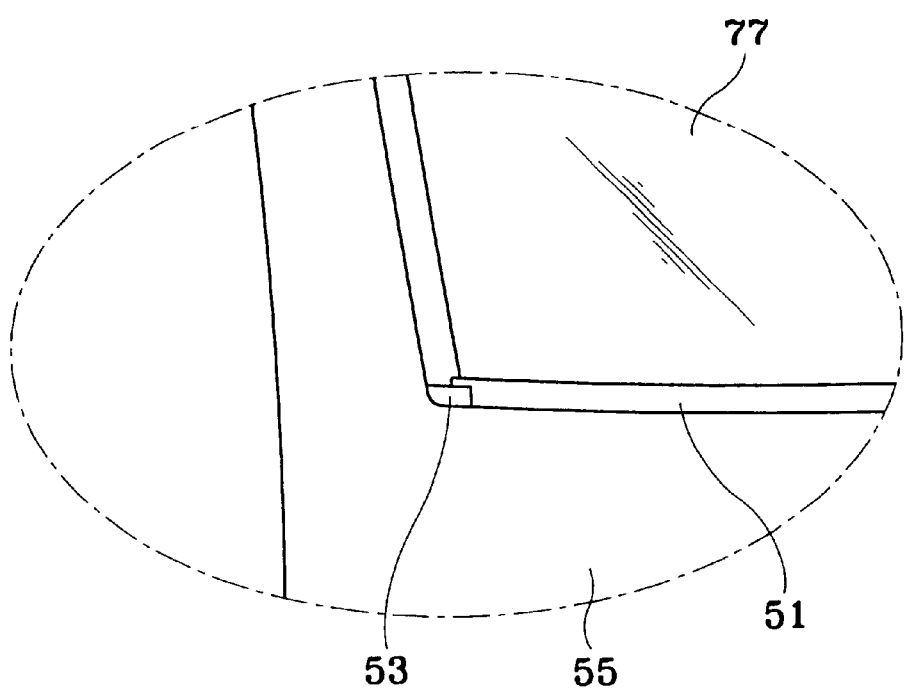
FIG. 2 is an enlarged view of a part of the door portion of a vehicle utilizing the present invention as circled in FIG. 1.
Figure 3:
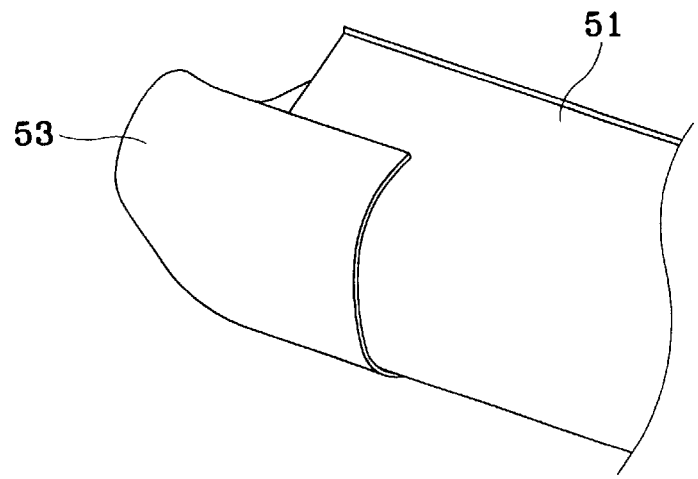
FIG. 3 is a perspective view of an outside weather strip and the end piece of FIG. 2.

As shown in FIGS. 1 to 5, an outside weather strip of a vehicle according to an embodiment of the present invention includes a movable end piece 53 slidably fitted to an end of the outside weather strip 51 in a lengthwise direction. As is generally known in the art, strip 51 may comprise a body piece of resilient material. Sliding means connects the movable end piece 53 to the outside weather strip 51 and for adjusting or fixing the movable end piece 53 in relation to the outside weather strip 51, such that a gap between the door outer panel 55 and movable end piece 53 is not formed.

Preferably, the means for sliding the movable end piece 53 in relation to the weather strip 51 and for maintaining the moving status at a constant form includes a fixed block 57 formed at the end of the weather strip, a movable block 59 provided on the movable end piece 53, a guide bolt 61 passing through the movable block 59 in a lengthwise direction of the weather strip 51 and threadably coupled to the fixed block 57, and restricting means for restricting the guide bolt 61 and the movable block 59 in the lengthwise direction of the weather strip 51.

When the guide bolt 61 rotates and moves in the lengthwise direction of the weather strip 51, the movable block 59 moves together with the guide bolt 61. Therefore, the movable end piece 53 moves in the lengthwise direction of the weather strip 51. The restricting means, includes a non-threaded part 63 without threads on the portion proximal to a head portion 65 of the guide bolt 61 in order to rotate in relation to the movable block 59. A snap ring 67 is fastened to the guide bolt 61 at a side opposite to the head portion 65 of the guide bolt 61 to restrict relative linear motion of the movable block 59 fitted to the non-threaded part 53.

The movable block 59 is preferably provided with a though hole 69 which is large enough for the threads of the guide bolt 61 to easily pass through. The non-threaded part 63 of the guide bolt 61 is inserted into the movable block 59, and has a sufficient thickness to properly support the moveable end pieces 53.

Figure 4:
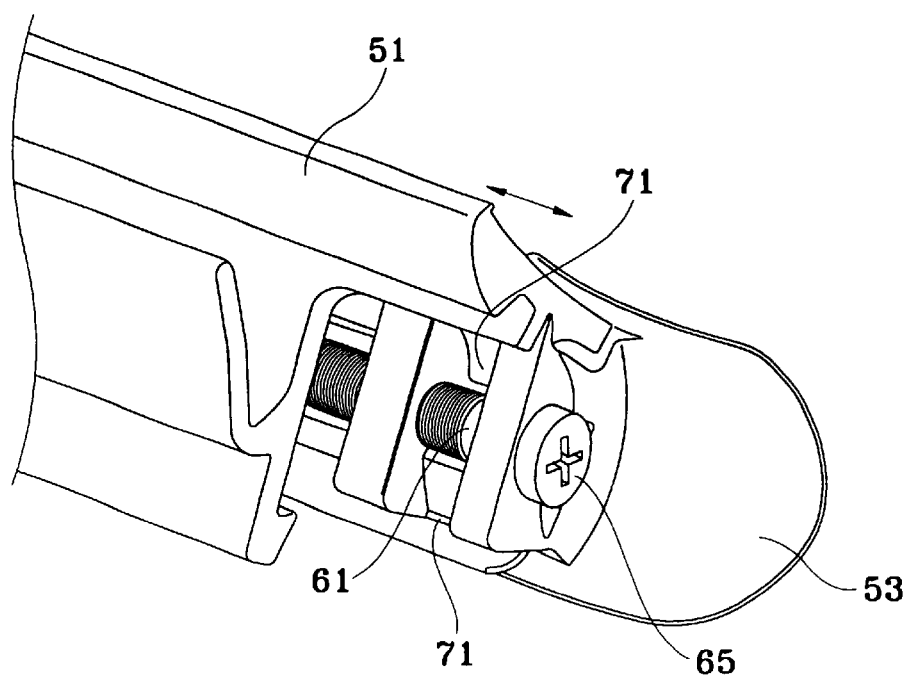
FIG. 4 illustrates the rear side of FIG. 3.
Figure 5:
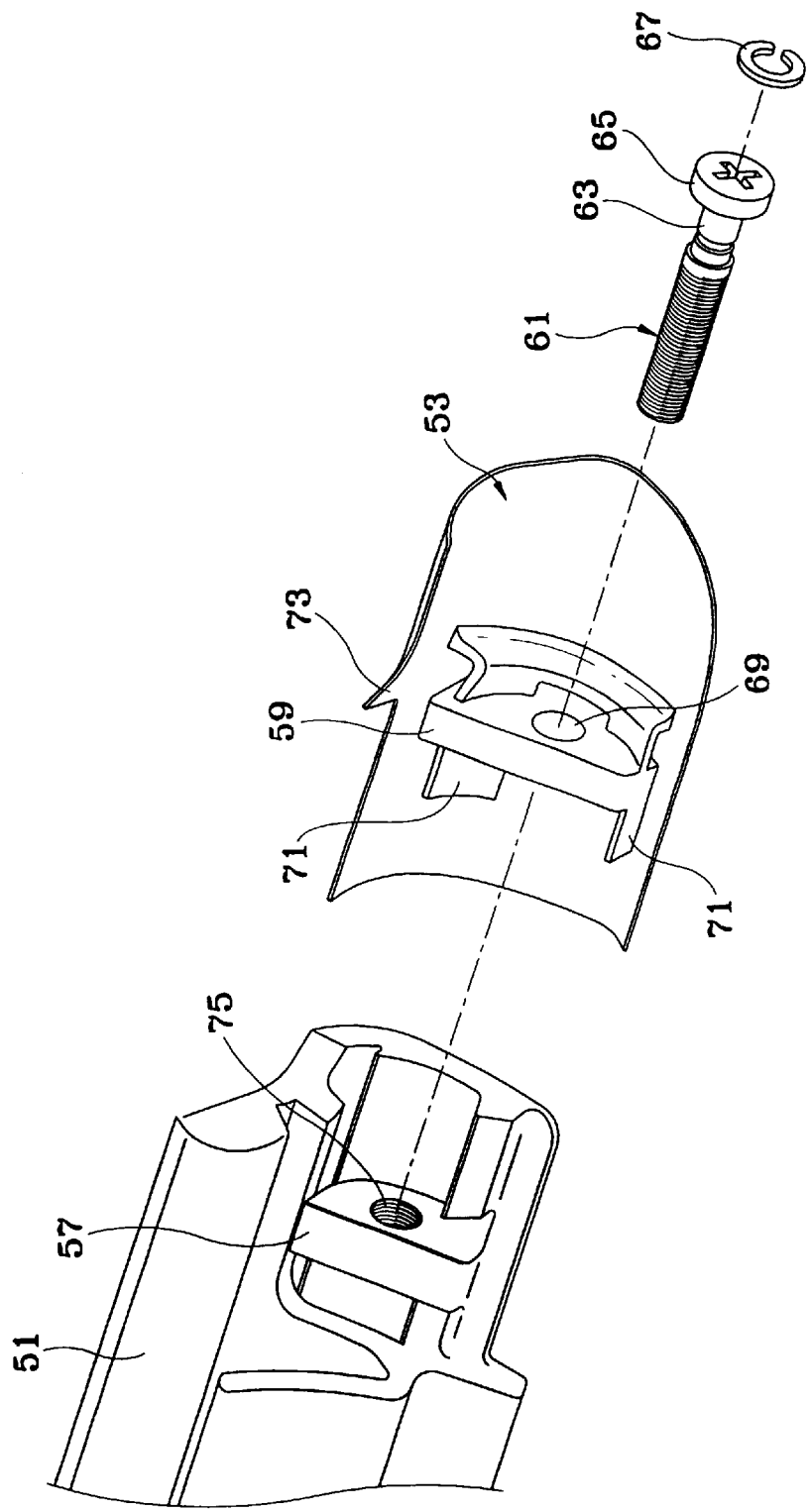
FIG. 5 is an exploded perspective view of FIG. 4.

A guide plate 71 is provided in the movable end piece 53, for guiding the movable end piece 53 in relation to the weather strip 51 while surrounding the inner end of the weather strip 51. In the preferred embodiment of the present invention, there are provided two guide plates 71 as shown in FIGS. 4 and 5. An indicating protuberance 73 may be formed on a side of the movable end piece 53 for easy assembly with the outside weather strip 51.

In the initial stage of assembling the weather strip 51, the movable end piece 53 is slidably fitted into the end of the weather strip 51 as shown in FIG. 5. Then the guide bolt 61 is inserted through the movable block 59 into the fixed block 57 while the threaded portion of the guide bolt 61 is inserted into a threaded hole 75 of the fixed block 57.

When the guide bolt 61 is completely inserted into the movable block 59, and thus, the movable block 59 is fitted to the non-threaded part 63, then the snap ring 67 is fastened to the guide bolt 61. Thus the linear movement of the guide bolt 61 relative to the weather strip 51 is transmitted to the movable end piece 53, but the rotational movement of the guide bolt 61 is not transmitted to the movable end piece 53.

The outside weather strip 51, which may be preferably assembled as described above, is installed so that a sealing is formed between the door outer panel 55 and the movable glass 77 like the conventional weather strip. The movable end piece 53, which is installed at the end of the weather strip 51, can be adjusted by rotation of the guide bolt 61. Therefore, the guide bolt is properly and adjustably rotated so that the formation of a gap between the door outer panel 55 and the movable end piece 53 is prevented, and the movable end piece 53 is closely contacted with the bent portion of the door outer panel 55.

The position of the movable end piece 53 is secured so long as the guide bolt 61 is not rotated with an external force. Consequently the outside weather strip 51 maintains close contact with the door outer panel 55. In addition, noise arising from gaps formed in outside weather strips can be prevented, while also preserving the aesthetic feature of the outside weather strip.

According to the present invention as described above, there is provided a movable end piece that can be manipulated via guide bolt in the lengthwise direction of the weather strip in relation to the end of the weather strip. Accordingly, a tight seal is formed between the movable end piece and door outer panel, eliminating any formation of gaps, preventing noise generated by blowing wind, and maintaining the aesthetic feature of the outside weather strip.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An outside weather strip for a vehicle, comprising:

a movable end piece slidably fitted to an end of said outside weather strip in the lengthwise direction of said outside weather strip; and sliding means for connecting the movable end piece to said outside weather strip, and for adjusting or fixing said movable end piece in relation to said outside weather strip, said sliding means comprising, a fixed block formed at the end of said outside weather strip;

a movable block provided on said movable end piece;

a guide bolt passing through said movable block in the lengthwise direction of said outside weather strip and threadably coupled to said fixed block; and restricting means for restricting said guide bolt and said movable block in the lengthwise direction of said outside weather strip.

2. The outside weather strip as claimed in claim 1, further comprising a guide plate provided on said movable end piece for guiding the sliding motion of said movable end piece in relation to said outside weather strip while surrounding the inside of the end of said outside weather strip.

3. The outside weather strip as claimed in claim 1, wherein said restricting means comprises:

a non-threaded part without threads on the portion proximal to a head portion of said guide bolt, and capable of performing rotation in relation to said movable block; and a snap ring fastened to said guide bolt to restrict the relative linear motion of said movable block.

4. The outside weather strip as claimed in claim 1, wherein a protuberance is formed on the side of said movable end piece for easy assembling.

5. An outside weather strip, comprising a weather strip body piece;

a threaded connector formed on an end of the body piece;

a moveable end piece slideably fitted on the end of the body piece, said moveable end piece having extending portion with a hole therethrough; and a bolt passing through said hole and received in said threaded connector.

6. The outside weather strip of claim 5, wherein said extending portion has guide plates extending therefrom towards the threaded connector, said guide plates being configured to guide said moveable end piece into alignment with said body piece.

7. The outside weather strip of claim 5, wherein said bolt includes a threaded portion and a head with said threaded portion spaced from the head a sufficient distance to permit free rotation in said hole in the moveable end piece.

* * * * *